US012146226B2

(12) United States Patent
Richet et al.

(10) Patent No.: US 12,146,226 B2
(45) Date of Patent: Nov. 19, 2024

(54) ULTRASOUND DEGREASING MANAGEMENT

(71) Applicant: ArcelorMittal, Luxembourg (LU)

(72) Inventors: Pierre Richet, Metz (FR); Florent Sponem, Vigy (FR)

(73) Assignee: ArcelorMittal, Luxembourg (LU)

( * ) Notice: Subject to any disclaimer, the term of this patent is extended or adjusted under 35 U.S.C. 154(b) by 541 days.

(21) Appl. No.: 17/284,158

(22) PCT Filed: Nov. 5, 2019

(86) PCT No.: PCT/IB2019/059490
§ 371 (c)(1),
(2) Date: Apr. 9, 2021

(87) PCT Pub. No.: WO2020/095198
PCT Pub. Date: May 14, 2020

(65) Prior Publication Data
US 2021/0332485 A1 Oct. 28, 2021

(30) Foreign Application Priority Data
Nov. 6, 2018 (WO) .................. PCT/IB2018/058707

(51) Int. Cl.
*C23G 3/02* (2006.01)
*B08B 3/12* (2006.01)
*C23G 1/14* (2006.01)

(52) U.S. Cl.
CPC .............. *C23G 3/025* (2013.01); *B08B 3/123* (2013.01); *C23G 1/14* (2013.01); *C23G 3/021* (2013.01)

(58) Field of Classification Search
CPC .......... C23G 3/025; C23G 1/14; C23G 3/021; C23G 3/02; B21B 45/0275;
(Continued)

(56) References Cited

U.S. PATENT DOCUMENTS 3,572,352 A * 3/1971 Koopman ............... B08B 3/123 15/94
3,638,666 A 2/1972 Fishman et al.
(Continued)

FOREIGN PATENT DOCUMENTS

CN 102330103 A 1/2012
CN 202139655 U 2/2012
(Continued)

OTHER PUBLICATIONS

Kim, "A method for degreasing strip" Jun. 2005, KR-20050063145-A—machine translation (Year: 2005).*
(Continued)

*Primary Examiner* — David G Cormier
*Assistant Examiner* — Thomas Bucci
(74) *Attorney, Agent, or Firm* — Davidson Kappel LLC

(57) ABSTRACT

A method for continuously cleaning a moving strip in a cleaning installation including a tank containing an aqueous solution, at least a roll immerged in the aqueous solution for guiding the strip into the tank, at least an ultrasound emitter a feed for feeding an aqueous solution inside the tank, a tank emptier for emptying the tank, an aqueous solution estimator for estimating the aqueous solution level in the tank, a distance calculator for calculating, for each ultrasound emitter, its distance to the aqueous solution level and a power controller for controlling the power of the at least one ultrasound emitter including the following steps, performed continuously: —estimating the aqueous solution level in the tank, —calculating for each ultrasound emitter its distance to the aqueous solution level, —comparing for each ultrasound emitter its distance to the aqueous solution level to a determined threshold.

12 Claims, 4 Drawing Sheets

(58) Field of Classification Search
CPC ............ B21B 45/0251; B21B 45/0269; B21B 45/0284; B08B 3/123; B08B 7/028; B08B 3/041; B08B 1/02; B08B 3/022; B08B 5/023
USPC ........................................................ 134/64 R
See application file for complete search history.

(56) References Cited

U.S. PATENT DOCUMENTS

| | | | | |
|---|---|---|---|---|
| 4,167,424 | A | 9/1979 | Jubenville et al. | |
| 4,193,842 | A * | 3/1980 | Rushing | D21F 1/32 134/1 |
| 4,537,511 | A | 8/1985 | Frei et al. | |
| 4,836,684 | A * | 6/1989 | Javorik | B08B 3/12 366/127 |
| 4,996,998 | A * | 3/1991 | Seiz | C23G 3/026 134/107 |
| 5,617,887 | A * | 4/1997 | Shibano | B08B 7/00 134/1 |
| 5,897,764 | A | 4/1999 | Pempera et al. | |
| 6,266,983 | B1 * | 7/2001 | Takada | G01N 29/11 73/620 |
| 2003/0005942 | A1 | 1/2003 | Johnson et al. | |
| 2007/0175496 | A1 | 8/2007 | Rattray et al. | |
| 2008/0210256 | A1 * | 9/2008 | Kretschmer | B08B 3/12 134/1 |
| 2010/0146713 | A1 | 6/2010 | Medan et al. | |
| 2013/0031872 | A1 * | 2/2013 | Blaiss | D06B 21/00 53/111 R |
| 2013/0312789 | A1 | 11/2013 | Uchibe et al. | |
| 2015/0368743 | A1 | 12/2015 | Larnicoal et al. | |
| 2017/0225205 | A1 | 8/2017 | Wellens et al. | |
| 2022/0008961 | A1 * | 1/2022 | Richet | B08B 3/123 |

FOREIGN PATENT DOCUMENTS

| | | | |
|---|---|---|---|
| CN | 103418575 | A | 12/2013 |
| CN | 103785643 | A | 5/2014 |
| CN | 203900020 | U | 10/2014 |
| CN | 104550114 | A | 4/2015 |
| CN | 105209644 | A | 12/2015 |
| EP | 0 789 095 | | 8/1997 |
| JP | 2001170583 | A | 6/2001 |
| KR | 2005 006 3145 | | 6/2005 |
| KR | 20050063145 | A * | 6/2005 |

OTHER PUBLICATIONS

International Search Report of PCT/IB2019/059490, dated Dec. 2, 2020.
See googlepatents translation of SU323242 A1 (Dec. 10, 1971), original patent document currently not available.
See googlepatents translation of SU360188 A1 (Nov. 28, 1972), original patent document currently not available.

* cited by examiner

ULTRASOUND DEGREASING MANAGEMENT

The present invention relates to an equipment for continuously cleaning a strip in a tank with ultrasound. Such an invention eases the global management of said cleaning tank.

BACKGROUND

In the metallurgical field, producing strip having a high surface quality is of a major importance. During the rolling step, iron, metallic particles, dirt and grease adhere to the metal strip. Such adhesions engender a degradation of the strip surface quality post-coating because they will be entrapped under the coating and thus the surface will not be smooth. In order to avoid such drawbacks, the strip is cleaned before the coating step. Generally, it occurs after the rolling operation and before the annealing or the coating. To do so, most of the cleaning lines uses an electrolytic process among their cleaning operations. However, such a technique presents a high safety risk due to the $H_2$ accumulation leading to safety hazards such as fire. Consequently, cleaning lines using ultrasound have been developed to replace the electrolytic process. Naturally, new problems have arisen, especially concerning the management of the ultrasound emitting means. Usually, transducers converting oscillating electrical energy into mechanical energy are used, creating the ultrasound. Despite those emerging problems, such lines are interesting because they are safer, create fewer by-products and have a lower electrical consumption, being thus more eco-friendly.

Ultrasound cleaning works thanks to the propagation of an ultrasound wave (or more generally an acoustic wave) through an aqueous solution which induces local variations of the aqueous solution pressure. When the negative pressure is low enough (lower than the aqueous solution vapour pressure), the aqueous solution cohesive forces break down, and gas bubbles (also called cavitation bubbles) are formed. These bubbles are then submitted to pressure variations (due to acoustic wave propagation), which cause them to expand and contract successively until they collapse. Ultrasonic waves induce a thermal effect, but also a mechanical effect due to cavitation. Indeed, two phenomena occur when cavitation bubbles break down:

shock waves due to the violent compression of the gas present in the bubble, micro-jets: near a solid surface, the bubble implosion becomes dissymmetrical and the resulting shock wave produces aqueous solution micro-jets that are directed toward the solid surface. The impacts of the micro-jets on the solid surface are energy-rich, and this mechanical effect can be used in galvanization for the cleaning of the strip surface after cold rolling.

Patent KR 2005 006 3145 discloses an apparatus cleaning a steel sheet. Said steel sheet is passed through a tank filled with an alkaline solution in which ultrasound emitting means are arranged inside boxes placed on each side of the passing sheet.

However, by using the above method and its equipment, the ultrasound emitting means power cannot be efficiently managed.

SUMMARY OF THE INVENTION

It is an object of the present invention to provide a solution solving the aforementioned problems.

The present invention provides a method for continuously cleaning a moving strip in a cleaning installation comprising a tank containing an aqueous solution, at least a roll immerged in said aqueous solution for guiding said strip into said tank, at least an ultrasound emitting mean, means for feeding an aqueous solution inside said tank, means for emptying said tank, means for estimating the aqueous solution level in the tank, means for calculating, for each ultrasound emitting mean, its distance to the aqueous solution level and means for controlling the power of the said at least one ultrasound emitting mean comprising the following steps, performed continuously:

- estimating the aqueous solution level in the tank,
- calculating for each ultrasound emitting mean its distance to the aqueous solution level,
- comparing for each ultrasound emitting mean its distance to the aqueous solution level to a determined threshold,
- decreasing the power of an ultrasound emitting mean having its distance to the aqueous solution level under said determined threshold.

The present invention also provides an equipment (1) for the continuous cleaning of a strip (S) comprising:

- a tank (2) containing an aqueous solution (3),
- at least a roll (4),
- at least an ultrasound emitting mean (5),
- means for feeding an aqueous solution (6) inside said tank,
- means for emptying the tank (7),
- means for estimating the aqueous solution level (8),
- means for calculating (10) for each ultrasound emitting mean its distance to the aqueous solution level (9),
- means for controlling the power (11) of the at least one ultrasound emitting mean (5) and
- a wire (W) connecting said means for controlling the power (10) of the at least one ultrasound emitting mean (5) and the at least one ultrasound emitting mean (5).

Other characteristics and advantages of the invention will become apparent from the following detailed description of the invention.

BRIEF DESCRIPTION OF THE DRAWINGS

To illustrate the invention, various embodiments and trials of non-limiting examples will be described, particularly with reference to the following figure:

FIG. 6 shows the effect of the type of ultrasound emitting means on the cleaning efficiency.

DETAILED DESCRIPTION

The invention relates to a method for continuously cleaning a moving strip in a cleaning installation comprising a tank containing an aqueous solution, at least a roll immerged in said aqueous solution for guiding said strip into said tank, at least an ultrasound emitting mean, means for feeding an aqueous solution inside said tank, means for emptying said tank, means for estimating the aqueous solution level in the tank, means for calculating, for each ultrasound emitting mean, its distance to the aqueous solution level and means for controlling the power of the said at least one ultrasound emitting mean comprising the following steps, performed continuously:

estimating the aqueous solution level in the tank, calculating for each ultrasound emitting mean its distance to the aqueous solution level, comparing for each ultrasound emitting mean its distance to the aqueous solution level to a determined threshold.

Figure 1A:
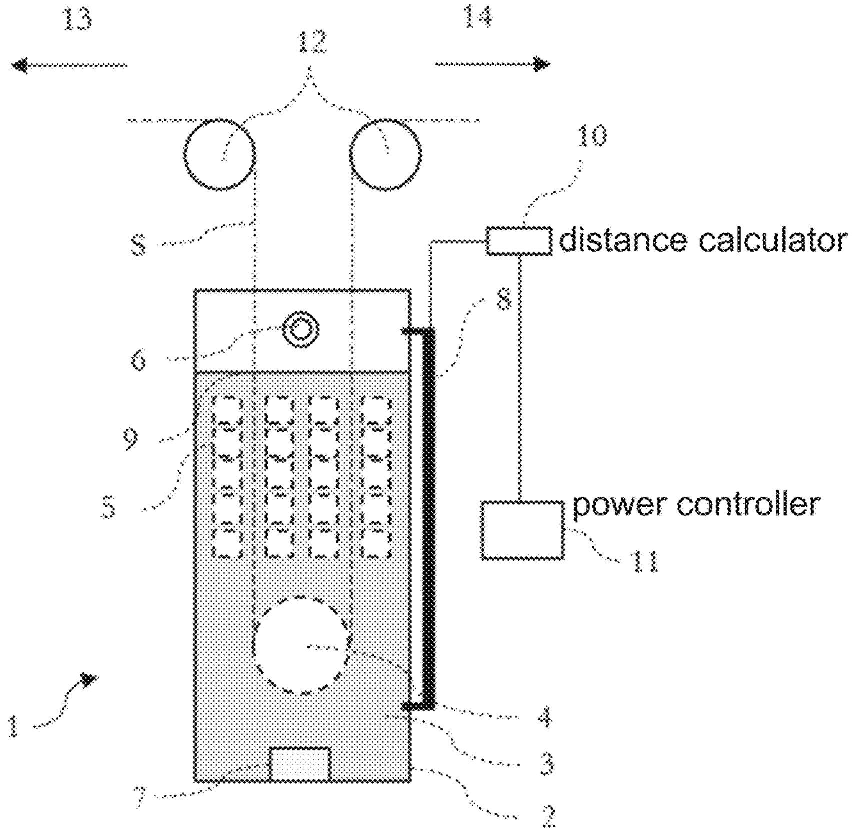
FIGS. 1A and 1B exhibit a lateral and a front view of an embodiment of a tank with ultrasound emitting means.
Figure 1B:
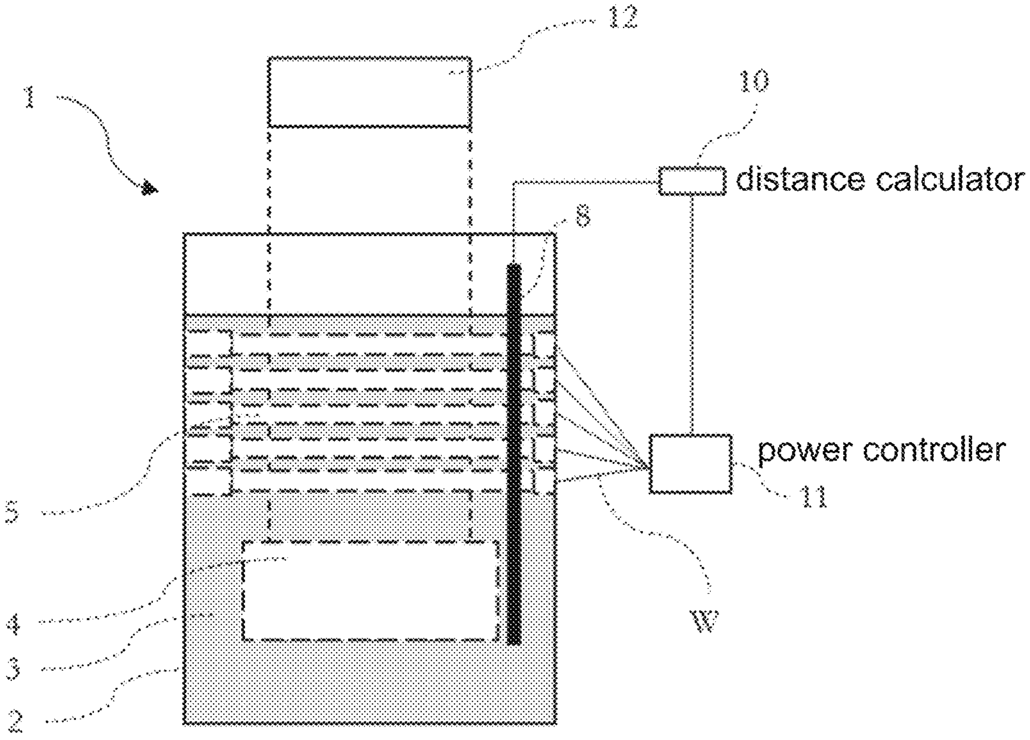

As illustrated in FIGS. 1A and 1B, the cleaning installation 1 of a passing strip S comprises a tank 2, an aqueous solution 3 inside said tank. It also comprises at least a roller 4 immerged in said aqueous solution 3, at least an ultrasound emitting mean 5, means for feeding 6 an aqueous solution and emptying 7 the tank. Moreover, it also comprises means for estimating 8 the aqueous solution level 9, means for calculating 10 for each ultrasound emitting mean its distance to the aqueous solution level and means for controlling the power 11 of the at least one ultrasound emitting mean 5.

The feeding means 6 are preferentially situated in the upper portion of the tank or at the top of the tank allowing a better filling of the tank, so the cleaning time and the distance passed by the strip through the aqueous solution is increased. The emptying means 7 are placed in the lower portion of the tank and preferentially at its bottom in order to empty the tank as much as possible, such means can be pipes and valves connected to a dump, a recycling or a regenerating process.

The at least one immerged roller 4 is preferentially at the bottom of the tank but above the emptying means 7, such an arrangement increases the distance travelled by the strip S through the aqueous solution 3 and the cleaning time thus improving the cleaning.

The aqueous solution 3 is introduced into the tank by the feeding means 6 such as pipes and valves, preferentially connected to another tank filled with the solution.

The cleaning installation 1 preferably comprises at least two external rollers 12 placed above said tank 2, at least one on each side of the tank e.g.: one on the upstream side 13, the other one on the downstream side 14 of the ultrasonic cleaning installation. The rollers 12 and 4 have preferentially the same orientation, e.g. their rotation axes are parallel. The rollers positioning should allow the strip S to pass through the aqueous solution 3 without being twisted.

The means for estimating 8 the aqueous solution level 9 can be a differential pressure captor or any means used in a hydrostatic method. The means for measuring 8 the aqueous solution level can also be composed of several aqueous solution level indicators, disposed along the bath height indicating the presence or not of an aqueous solution permitting to estimate the aqueous solution level between two indicators. Such level indicators can be vibrating level switches.

The at least one ultrasound emitting mean 5 is placed inside said tank 2 under the feeding means 6 and preferably above the immerged roller 4.

The means for controlling the power 11 of the at least one ultrasound emitting mean control individually if each ultrasound emitting mean is on or off, e.g.: if it produces ultrasound or not.

Knowing the ultrasound emitting mean position, e.g.: at what height they are positioned and the aqueous solution level thanks to the means for estimating the aqueous solution level, the means for controlling the power 11 of the at least one ultrasound emitting mean 5 determine for each ultrasound emitting mean 5 its distance to the aqueous solution level and compare it to a determined threshold. Said determined threshold is equal to the minimum distance at which the ultrasound emitting mean 5 should be immersed into the aqueous solution 3 to use it without damaging it or breaking it.

In the case where several aqueous solution indicators are used, each aqueous solution level indicator is preferentially placed at least at a distance equal to the determined threshold above a ultrasound emitting means. So the means for calculating 10 for each ultrasound emitting mean its distance to the aqueous solution level determine for each ultrasound emitting mean if it is below the aqueous solution level at a distance at least equal to the determined threshold.

The wires connecting the ultrasound emitting mean 5 to the means for controlling the power 11 of the ultrasound emitting mean can be placed in a rack. Such an arrangement permits to prevent hazard and stoppage of the line due to wires being cut or damaged.

In the prior art, it seems that the power of the ultrasound emitting mean has to be managed manually. On the contrary, with the method according to the present invention, it seems that the ultrasound power can be automatically managed as a function of the aqueous solution level.

Figure 2A:
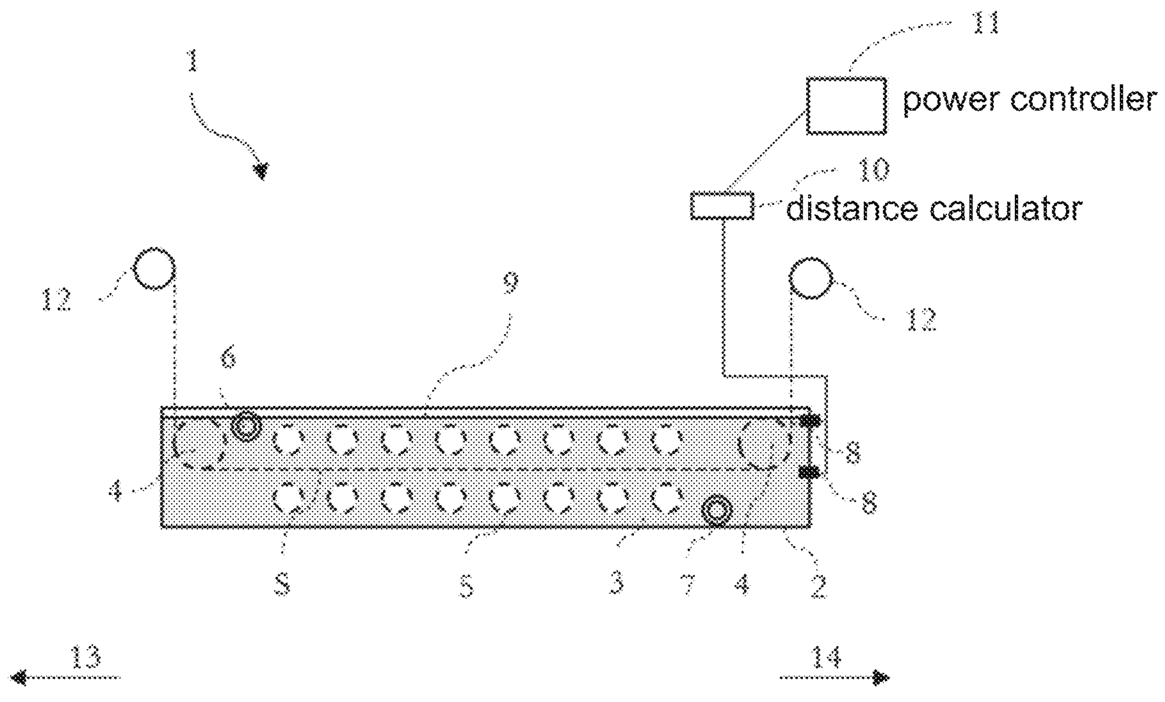
FIGS. 2A and 2B show a lateral and a top view of a second embodiment of a tank with ultrasound emitting means.
Figure 2B:
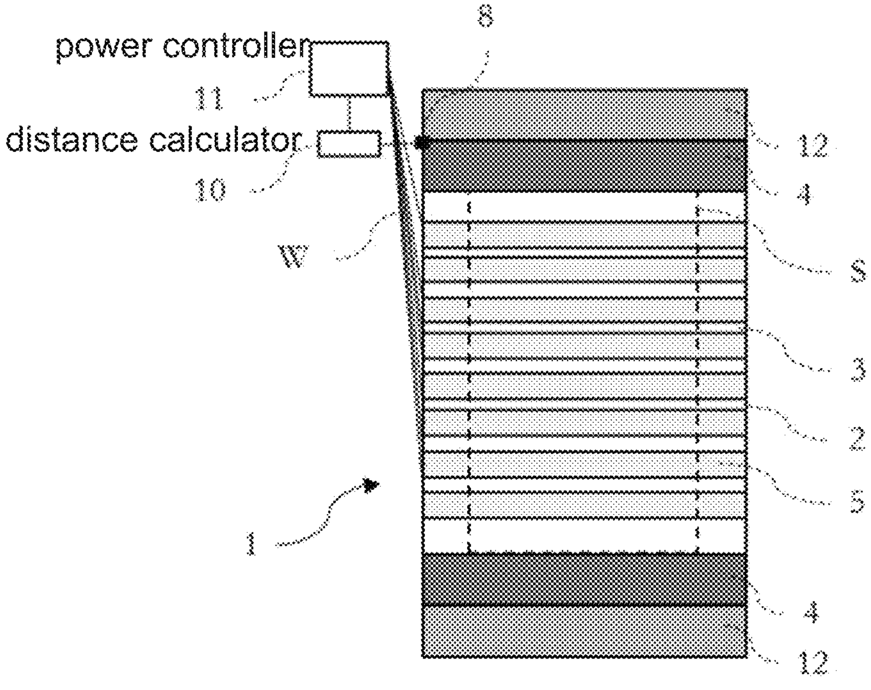

FIGS. 2A and 2B exhibit the lateral and top view of a second preferred embodiment of the continuous cleaning installation in which the strip S is majorly moved horizontally through the aqueous solution.

Preferably said method also comprises the step of decreasing the power of an ultrasound emitting mean having its distance to the aqueous solution level under said determined threshold. Such a method improves the previously presented method because it prevents energy loss because an ultrasound emitting mean above the aqueous solution, not cleaning the passing strip, consumes less energy. Apparently, such a method also prevents the breakage and/or overheating of an ultrasound emitting mean when it is not immerged of at least the determined threshold. The power is preferentially decreased in order that the ultrasound emitting mean is turned off.

Preferably, said aqueous solution level is being continuously adjusted to immerge all the ultrasound emitting means to a distance at least equal to a determined threshold. It enhances the cleaning performance because all the ultrasound emitting means are used so the installation is used at its full potential. In the continuous cleaning installation, the means for controlling the power 11 is not only connected to the means for measuring 8 the aqueous solution level 9 and the ultrasound emitting means management system but also to the feeding 6 and emptying 7 means.

Preferably said method also comprises the step of increasing the previously decreased power of an ultrasound emitting mean when its distance to the aqueous solution level is above or equal to said determined threshold. This step improves the described method because all the ultrasound emitting means that can be efficiently used are used, so the cleaning is as efficient as it can be. The power is preferentially increased in order that the ultrasound emitting mean is used at its maximal power.

Preferably, said strip is a metal strip. More preferably, said metal strip is a steel strip.

Preferably, said aqueous solution contains between 10 grams per litre and 40 grams per litre of alkali product. Apparently, an alkali product concentration in this range improves the cleaning and efficiently uses the alkali product.

Other solutions such as acidic or neutral solutions can be used, the solution selection depends on the substrates and the pollutants.

Preferably, said aqueous solution is at a temperature between 30° C. and 80° C. Apparently, higher is the cleaning solution temperature, better is the cleaning efficiency of the process but shorter is the ultrasound emitting mean lifespan. This range seems to be the best compromise between cleaning efficiency and the ultrasound emitting mean lifespan.

Preferably, said continuous cleaning installation 1 comprises means for measuring the strip speed and the ultrasound emitting means are switched off when the strip speed is under 5 $m \cdot s^{-1}$. Even more preferably, the ultrasound emitting means are switched off when the strip speed is 0 $m \cdot s^{-1}$. It permits to reduce the energy consumption when a problem appears on the line. In order to do so, the strip speed is sent to the ultrasound emitting mean management system.

The invention also relates to an equipment 1 for the continuous cleaning of a strip S comprising:

a tank 2 containing an aqueous solution 3, at least a roll 4, at least an ultrasound emitting mean 5, means for feeding an aqueous solution 6 inside said tank, means for emptying the tank 7, means for estimating the aqueous solution level 8, means for calculating 10 for each ultrasound emitting mean its distance to the aqueous solution level 9, means for controlling the power 11 of the at least one ultrasound emitting mean 5 and a wire W connecting said means for controlling the power 11 of the at least one ultrasound emitting mean 5 and the at least one ultrasound emitting mean 5.

Figure 3A:
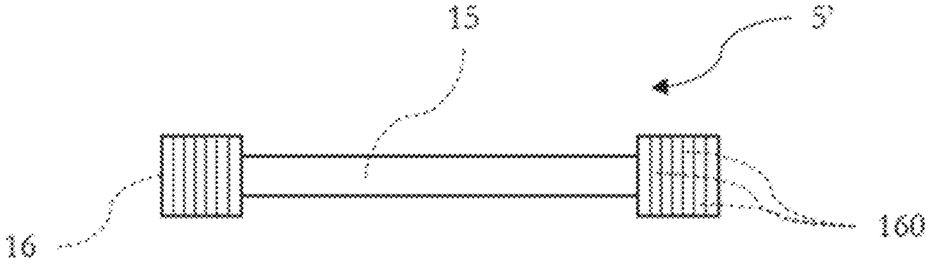
FIGS. 3A and 3B exhibit two embodiments of tubular piezo-electric transducers.
Figure 3B:
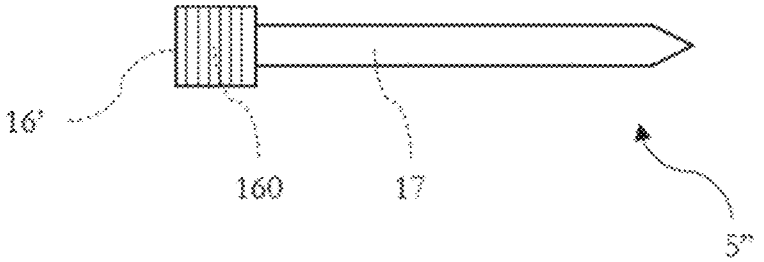

Preferably, as illustrated in FIGS. 3A and 3B, said at least one ultrasound emitting mean is a resonator rod 15 vibrating thanks to at least one piezo-electric transducer 160. Such ultrasound emitting means can be a push-pull transducer 5'. Such ultrasound emitting means allow an omnidirectional emission of ultrasound. Consequently, it improves the cleaning efficiency compared to boxes containing ultrasound emitting means. As illustrated in FIG. 3A, those ultrasound emitting means, the push-pull transducers, have generally a central resonator rod 15 encompassed by two ultrasonic driverheads 16 generally containing the at least one piezo-electric transducer 160. Said driverhead generally comprises several piezoelectric transducers. Even more preferably, they work at a frequency of 25 kHz and generates 2 kW. However, the ultrasound emitting means 5" can also be comprised of only one driverhead 16' and a resonator rod having a pointy end 17, as illustrated in FIG. 3B.

Several tests have been done to demonstrate the improved efficiency of a cleaning tank equipped with transducers, such as push-pull transducers, compared to one equipped with submersible boxes. In those tests, the cleanliness of a strip sample has been measured before and after a cleaning step. In those experiments, a strip is immersed during 24 sec in a box containing a cleaning bath, having 10 $g \cdot L^{-1}$ of NaOH, at 65° C. and either a set of two push-pull piezo transducers having a power of 2 kW or a submersible box having a power of 2 kW. It is assumed that an immersion time of 24 seconds in the experiment conditions corresponds to a direct exposition time of about 6 seconds because a strip portion is faced by an ultrasound emitter means only during a quarter of the experiment time due to its displacement through the aqueous solution.

The cleaning efficiency, as noted in the following table, is: "the estimated cleanliness before the cleaning step" divided by "the estimated cleanliness after the cleaning step". To estimate the cleanliness, a 3M 595 Scotch™ adhesive is pressed on a strip surface in order to stick the iron fines and the oil onto the adhesive. Then the reflectance of the scotch is measured by a reflectometer. This reflectance is linked to the density of iron fines per square meter. The more iron fines have adhered to the adhesive, the lower will be its reflectance. Consequently, the higher is the adhesive reflectance, the cleaner is the strip. The following table contains the main parameters of the experiment. In FIG. 6, the cleaning efficiency is, for various strip speed, plotted for both types of ultrasound emitting means:the push-pull tubes and the submersible boxes.

| Type | Frequency (kHz) | Power (kW) | Bath temperature (° C.) | Strip speed ($m \cdot mm^{-1}$) | Immersion time (sec) | Cleanliness before cleaning | Cleanliness after cleaning | Cleaning efficiency (%) |
|---|---|---|---|---|---|---|---|---|
| Box | 25 | 2 | 65 | 50 | 24 | 9.50 | 7.00 | 26 |
| PP | 25 | 2 | 65 | 50 | 24 | 9.04 | 4.15 | 54 |
| Box | 25 | 2 | 63 | 100 | 24 | 10.55 | 7.62 | 28 |
| PP | 25 | 2 | 62 | 100 | 24 | 11.99 | 6.02 | 50 |
| Box | 25 | 2 | 64 | 150 | 24 | 10.00 | 8.09 | 19 |
| PP | 25 | 2 | 66 | 150 | 24 | 10.95 | 6.53 | 40 |
| Box | 40 | 2 | 67 | 100 | 24 | 8.51 | 6.61 | 22 |
| PP | 40 | 2 | 67 | 100 | 24 | 10.70 | 7.30 | 32 |

Preferably, said resonator rod has its length parallel to the strip width. Even more preferentially, the rod is positioned parallel to the strip width in a way that it covers the whole strip width as it can be seen in FIG. 1B. Such an arrangement should improve the cleaning efficiency and the cleaning homogeneity along the strip width. When the tank comprises at least two resonator rods having a resonator rod length smaller than the strip width, the resonator rods are shifted in order to cover the whole strip width.

The driverheads can be fixed on or attached to the tank walls, as represented in FIGS. 1A and 1B, or on a dedicated rack placed inside the bath. In both cases, a peculiar attention should be paid to the wires W to prevent hazards.

Figure 4A:
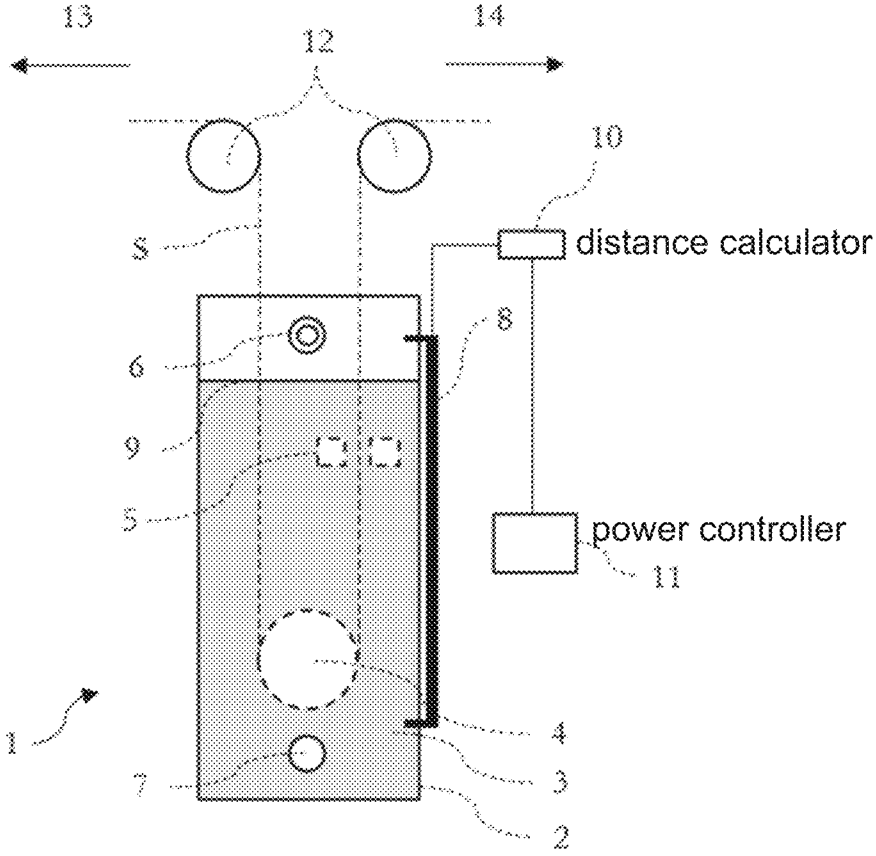
FIGS. 4A and 4B exhibit laterals views of two embodiments of an ultrasonic tank having the Ultrasound emitting means placed in the up and down ways.
Figure 4B:
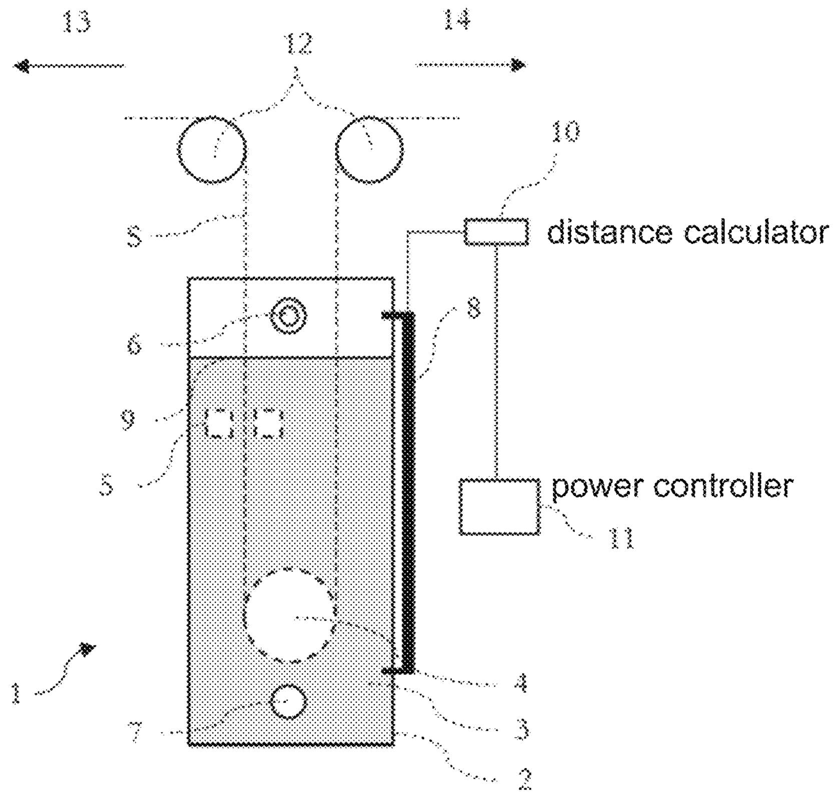

Preferably, as illustrated in FIGS. 4A and 4B, the strip S to be cleaned has two opposite surfaces and the equipment according to the invention comprises preferably at least one ultrasound emitting mean 5 facing each of said surface. Even though an ultrasound emitting mean placed on one side of a strip cleans both sides, having ultrasound emitting means on both sides increases the cleaning quality. More advantageously, when the strip is passed vertically or quasi vertically in the tank, at least an ultrasound emitting mean is placed on each side of the strip faces on its ways up and down, as represented in FIGS. 4A and 4B, at least four ultrasound emitting means are placed inside said bath.

Preferably, said equipment has a power density between 5 Watt per litre and 25 Watt per litre. Even more preferentially, the power per litre should be between 10 and 20 $W \cdot L^{-1}$. Using a power density in this range seems to be the best compromise between a sufficient cleaning and energy saving, it allows a good and sufficient cleaning of the strip and avoid energy waste.

Preferably, said resonator rod and the strip S are spaced by a distance comprised between 40 mm and 250 mm and even more preferentially between 60 and 200 mm. Such spacing enables to efficiently use the ultrasound emitting mean. Such spacing distance improves the installation because if the spacing if less than 40 mm, the ultrasound emitting mean will eventually be broken by the strip due for example strip bending or strip flatness irregularities. But if the spacing is bigger than 200 mm then the efficiency of the ultrasound emitting mean cleaning power seems to be severely reduced.

EXAMPLES

The following description will concern two installations for the continuous cleaning of a metal strip. But, the present invention is applicable to every process in which a band is cleaned by passing it through an aqueous solution filled tank comprising ultrasound emitting means.

This cleaning process starts by uncoiling the strip previously rolled. Then it can be but not necessarily passed through a pre-degreasing bath, a brushing and a rinsing step. Afterwards, it will undergo an ultrasonic cleaning process in an installation. Eventually the strip is dried and thus ready to be annealed and coated if desired.

Example 1

Figure 5:
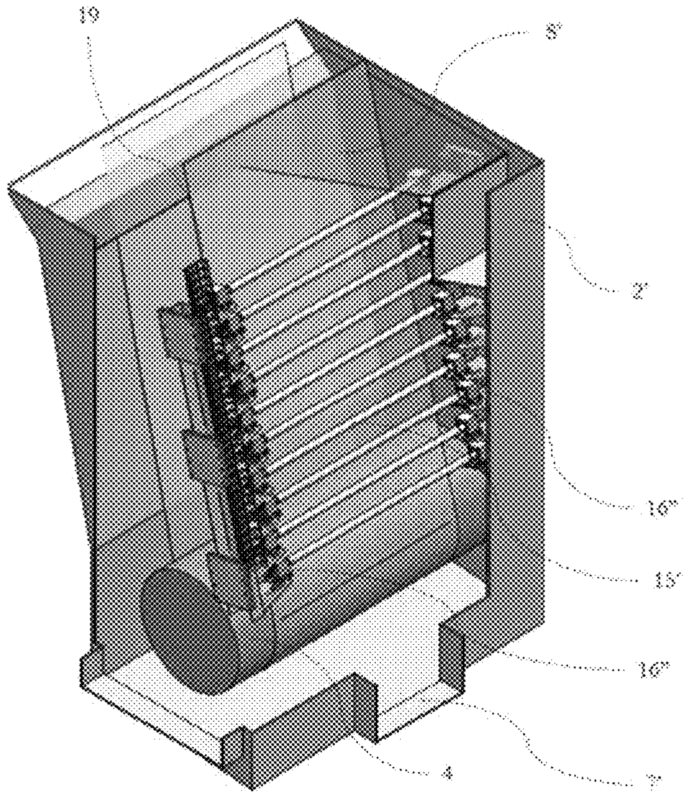
FIG. 5 represents a particular embodiment of the invention.

In a first particular embodiment, using the teaching of the present invention, the following installation is used. As represented in FIG. 5, this installation uses ten ultrasound emitting means. They are composed of two ultrasonic driverheads 16" mounted at each end of the resonator rod 15', used at 25 kHz and 2 kW each. The push-pull transducers are diagonally installed inside a tank 2' between a steel strip S' and a tank wall, they are disposed every 200 mm and are facing a strip face on its way-up. They are spaced from the strip by a distance equal to 100 mm. The rods are 1500 mm long and the passing strip is 1400 mm wide. Said tank is provided with feeding means (not represented) and emptying means 7' respectively at the top and the bottom of the tank. The aqueous solution is a solution heated at 55° C. containing 25 $g \cdot L^{-1}$ of alkali product.

The means for measuring the aqueous solution level is a differential pressure captor.

Each driverhead 16' is supported on both side by a platform 18 attached to the tank, on one side, a rack 19 is installed permitting to pass the wire alimenting the transducers through. The wires connect each transducer to the means for controlling the power 11 of the transducers, which is placed outside the bath. The means for measuring the aqueous solution level are connected to the means for calculating the distance of each ultrasound emitting means to the aqueous solution level which is also connected to the means for controlling the power 11 of the ultrasound emitting means. Said means for controlling the power 11 of the ultrasound emitting means depend on the bath level as explained previously.

Example 2

In a second particular embodiment, similar to the one represented in FIGS. 1A and 1B, using the teaching of the present invention, the following installation is used. This installation uses 24 ultrasonic emitting devices. The 24 ultrasonic devices form 4 rows of 6 devices each. Each faces of the strip, two on its way-up and two on its way down, has a row of ultrasonic devices in front of it. The six devices of a row are vertically aligned and spaced by 200 mm each. Each row is placed at 152 mm of the strip. They are composed of two ultrasonic driverheads at each end of the resonator rod, used at 25 kHz and 2 kW each. The rods are 1500 mm long and the passing strip is 1450 mm wide. Said tank is provided with feeding means and emptying means respectively at the top and the bottom of the tank, the ultrasonic devices are between the feeding and the emptying means. The aqueous solution is a solution heated at 45° C. containing 20 $g \cdot L^{-1}$ of alkali product.

The means for measuring the aqueous solution level are vibrating level switches. Six of them are installed in order to have one above each ultrasound emitting device. The vertical distance between each vibrating level switches and the ultrasound emitting device below is equal to the determined threshold, which is 4 cm in this case.

Each ultrasound emitting mean is supported on both side by a platform attached to the tank, on one side, a rack for each row is installed permitting to pass the wire alimenting the transducer through. The wires connect each transducer to the means for controlling the power of the ultrasound emitting means, which is placed outside the bath. The means for measuring the aqueous solution level are connected to the means for calculating the distance of each resonator rod to the aqueous solution level which is also connected to the means for controlling the power of the ultrasound emitting means. Said means for controlling the power of the ultrasound emitting mean depends on the bath level as explained previously.

The invention has been described above as to the embodiment which is supposed to be practical as well as preferable at present. However, it should be understood that the invention is not limited to the embodiment disclosed in the specification and can be appropriately modified within the range that does not depart from the gist or spirit of the invention, which can be read from the appended claims and the overall specification, and a manufacturing method of a hot-rolled steel sheet and a manufacturing apparatus of a hot-rolled steel sheet with such modifications are also encompassed within the technical range of the invention.

What is claimed is:

1. A method for continuously cleaning a moving metal strip in a cleaning installation comprising a tank containing an aqueous solution, at least one roll immerged in said aqueous solution for guiding said metal strip into the tank, and one or more ultrasound emitters, the method comprising the following steps, performed continuously:

estimating an aqueous solution level in the tank;

calculating for each of the one or more ultrasound emitters a distance to the aqueous solution level;

comparing for each of the one or more ultrasound emitters the distance to the aqueous solution level to a determined threshold; and decreasing the power of a one of the one or more ultrasound emitters having the distance to the aqueous solution level under the determined threshold.

2. The method as recited in claim 1 wherein the aqueous solution level is continuously adjusted to immerge all of the one or more ultrasound emitters to a distance at least equal to the determined threshold.

3. The method as recited in claim 1 further comprising increasing the previously decreased power of the one ultrasound emitter of the one or more ultrasound emitters when the distance to the aqueous solution level is above or equal to the determined threshold.

4. The method as recited in claim 1 wherein the aqueous solution contains between 10 grams per litre and 40 grams per litre of alkali product.

5. The method as recited in claim 1 wherein the aqueous solution is at a temperature between 30° C. and 80° C.

6. The method as recited in claim 1 further comprising measuring the metal strip speed and switching the one or more ultrasound emitters off when the metal strip speed is under 5 meters per second.

7. The method as recited in claim 1 wherein at least one of the one or more ultrasound emitters is a resonator rod vibrating thanks to at least one piezo-electric transducer.

8. The method as recited in claim 7 wherein the resonator rod has a length parallel to a width of the metal strip.

9. The method as recited in claim 1 wherein the metal strip has two opposite surfaces and the equipment includes at least one ultrasound emitter of the one or more ultrasound emitters facing each of said surfaces.

10. The method as recited in claim 1 wherein the cleaning installation has a power density between 5 Watt per litre and 25 Watt per litre.

11. The method as recited in claim 7 wherein the resonator rod and the metal strip are spaced by a distance between 40 mm and 250 mm.

12. The method as recited in claim 1 wherein the decreasing step includes decreasing the power of each of the one or more ultrasound emitters having the distance to the aqueous solution level under the determined threshold.

* * * * *